United States Patent [19]

Kuhn

[11] Patent Number: 4,907,466

[45] Date of Patent: Mar. 13, 1990

[54] KEY SHIFT TRANSMISSION

[75] Inventor: John B. Kuhn, Rubicon, Wis.

[73] Assignee: Deere & Company, Moline, Ill.

[21] Appl. No.: 237,666

[22] Filed: Aug. 25, 1988

Related U.S. Application Data

[63] Continuation of Ser. No. 944,089, Dec. 22, 1986, abandoned.

[51] Int. Cl.$^4$ .................................................. F16H 3/08
[52] U.S. Cl. ......................................... 74/378; 74/371; 74/377
[58] Field of Search ................ 74/362, 366, 369, 371, 74/372, 378, 376, 377; 192/71, 67 R

[56] References Cited

U.S. PATENT DOCUMENTS

| | | | |
|---|---|---|---|
| 3,028,763 | 4/1962 | Vetsch | 192/71 X |
| 3,812,735 | 5/1974 | von Kaler et al. | 74/371 |
| 4,480,501 | 11/1984 | von Kaler | 74/713 |
| 4,656,886 | 4/1987 | Edwards | 74/371 X |

FOREIGN PATENT DOCUMENTS 163057  5/1921  United Kingdom ................. 74/371

Primary Examiner—Dwight G. Diehl

[57] ABSTRACT

A multi-speed transmission with a shift mechanism which selectively couples at least a forward and a reverse gear operatively positioned on a shaft. The shift mechanism is disposed entirely within the transmission housing and includes a shift key arranged for sliding movement of the key in the shaft. An improved neutral collar is positioned on the shaft between the forward and the reverse gears. The neutral collar has its widest cross section centrally located thereto. From this widest central cross section, the neutral collar profile tapers along the inside surface thereof to relatively narrow cross section at each end thereof.

29 Claims, 3 Drawing Sheets

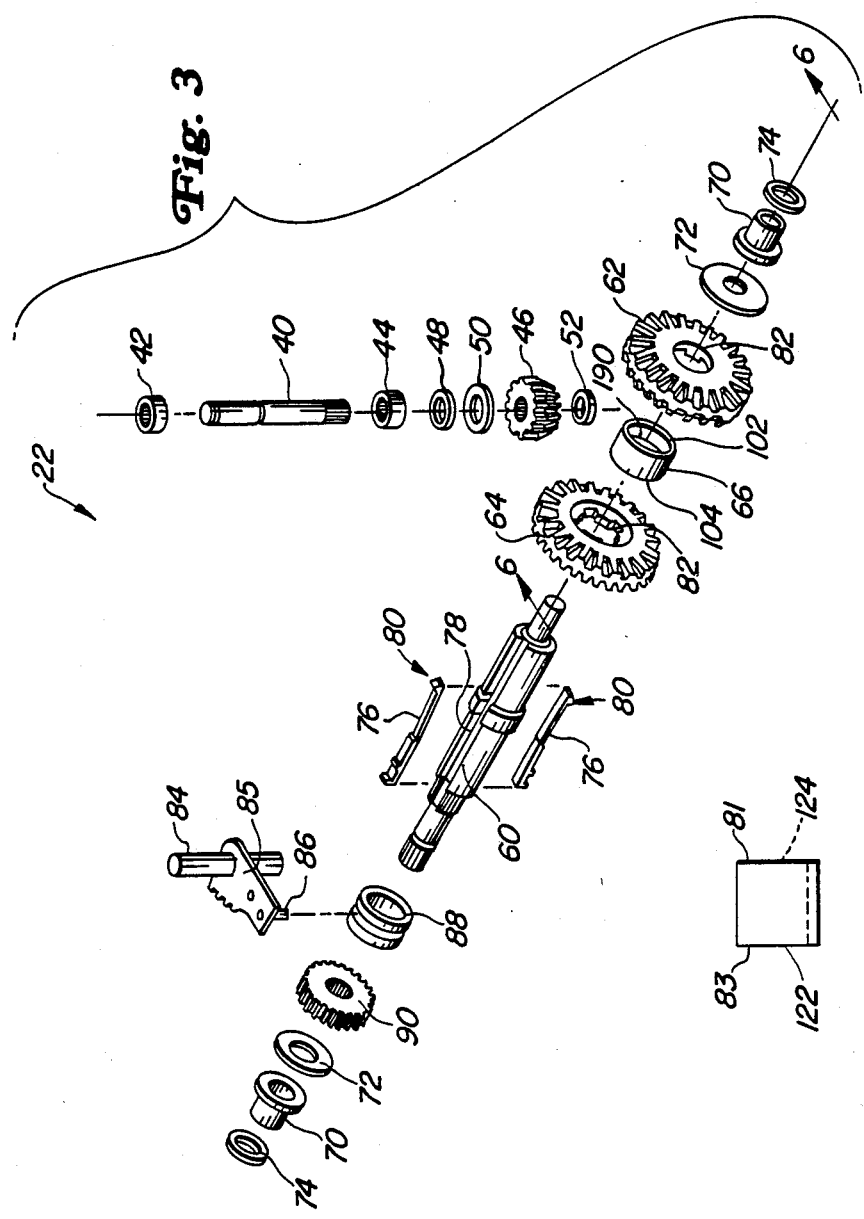
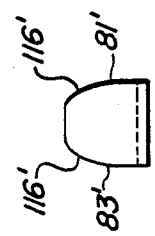

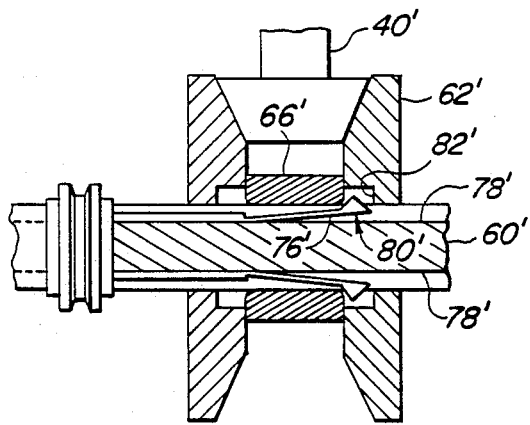
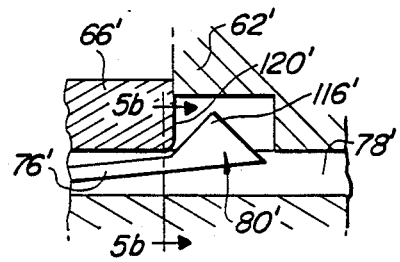
Fig. 4
(PRIOR ART)
Fig. 5a
(PRIOR ART)
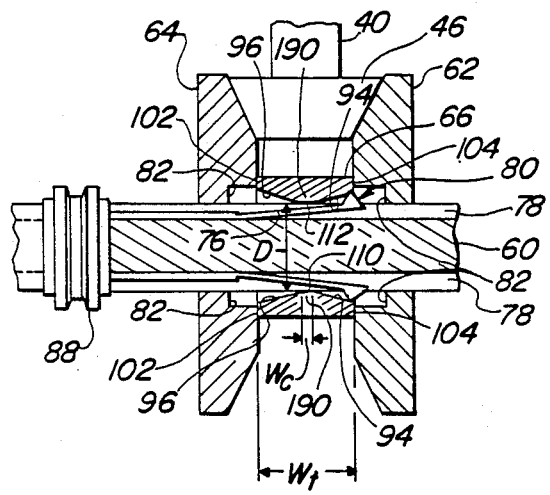
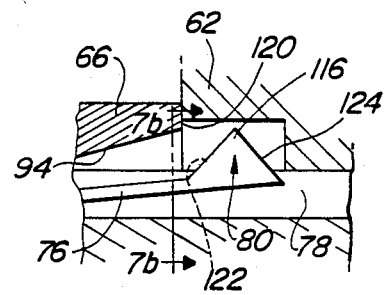
Fig. 6
Fig. 7a

KEY SHIFT TRANSMISSION

This application is a continuation of U.S. application Ser. No. 06/944,089 filed 22 December 1986, now abandoned.

BACKGROUND OF THE INVENTION

The present invention relates to transmissions and in particular to a gear shifting arrangement for a key shift transmission.

In key shift transmissions, at least one forward and one reverse gears forming a change-speed gear set are assembled side by side on a shift in constant running mesh with each other. The shifting arrangement drivingly couples either the forward or the reverse gear to the shaft one at a time to provide different directional motion. In one known type of shifting arrangement for this type of transmission, a key is axially slid into the groove of the shaft which both the forward and reverse gear are assembled to selectively couple one of the gears to the shaft. Normally, a neutral spacer collar is provided between the forward and the reverse gear.

It is conventional to mount the reverse gear both in close proximity to a plurality of forward gears or remote from a plurality of forward gears. U.S. Pat. No. 3,812,735 illustrates the technique of mounting the reverse gear remote from the forward gear and U.S. Pat. No. 4,480,501 illustrates the technique of mounting the reverse gear in close proximity to the forward gear so that the biased end of the key is used to engage and disengage reverse gear, thereby eliminating double clutching necessitated by using the blunt end of the key to engage reverse gear as disclosed by U.S. Pat. No. 3,812,735. As disclosed by U.S. Pat. No. 4,480,501, because the forward gears and reverse gears are in close proximity with each other, a positive neutral position collar is disposed on the shaft between the forward gears and reverse gears to give the user a positive indication or "feel" of the transmission or transaxle being in a neutral gear position. This positive neutral position is provided by a recess radially outwardly disposed in the inner surface of the collar which is conformed to the shape of the biased end of the key.

In one embodiment of the transaxle disclosed in U.S. Pat. No. 4,480,501, the neutral collar has slot-shaped recess which captures the biased end of the key when it is shifted between the forward gears and the reverse gears, while in a second embodiment, the collar has a circular recess which also captures the biased end of the key when it is positioned between the forward gears and reverse gear.

As shown in FIGS. 1 and 1a of U.S. Pat. No. 4,480,501, a neutral collar or spacer is positioned between the single forward and the single reverse gear of a belt driven small lawn and garden tractor. While the neutral spacer as illustrated was initially satisfactory to provide a means for shifting the key from neutral to either forward or reverse or from forward through neutral to reverse, or vice versa, problems developed relating to the amount of effort required by an operator to push or pull the key out of either forward or reverse into the neutral collar area, particularly where there was some belt drag to the transmission input, and when the operator shifted gears without utilizing the clutch. The prior neutral collar design engaged the keys in such a manner that wear areas which developed on the key after a period of time caused the key to disengage from the gear pockets without the operator moving the control lever.

As the key shift transmission was repeatedly shifted between forward and reverse without engaging the clutch, excessive wear on the key caused the key when engaged in the gear pocket to have a tendency to frequently disengage. Once this tendency developed, the key required repair which could only be accomplished by tearing down the transmission and replacing the keys, a rather time consuming and expensive operation.

Specifically, after a number of shifts without utilization of the clutch, laboratory testing indicated that the design of these prior neutral collars caused the key tip surface engaging the gear pocket do become so severely worn from impact with the gear pocket that the key tended to fly out of engagement with the gear pocket for a short period until the next pocket rotated into engagement with the key thereby causing a jerking action. This tendency for the key tip to disengage appears to result from hammering the sides of the key tip into a slope which translates in the pocket. When sloped, the key tip cannot carry the torque created by the engagement with the pocket because with side loading, the slope acts like a ramp and allows the key tip to kick out of the pocket.

At this point, the transmission must be disassembled and, as a minimum, the key replaced. The gear pockets and the shaft must also be reviewed for wear resulting of this severe impact and replaced if excessively worn.

Accordingly, there is a need for an improved key shift transmission having a neutral collar designed such that the above mentioned problems are overcome. Specifically, an improved neutral collar design should provide for a positive neutral feel as well as requiring minimum effort to move the key between forward and reverse gears particularly when there is some belt drag through the transmission input; and should reduce wear on the key such that the key will not disengage from the gear pocket unless positively moved by the control lever, despite excessive clutchless shifting, thereby significantly reducing the frequency of key, gear and shaft replacement thereby enhancing the serviceability and reliability of the entire transmission.

SUMMARY OF THE INVENTION

The present invention is an improved key shift transmission which greatly reduces the effort required to move the key from engagement with the forward gear and through the neutral collar into engagement with the reverse gear and vice versa particularly where there is some belt drag to the transmission input and which eliminates excessive wear on the key thereby preventing the key from disengaging the gear pockets without control lever movement.

As disclosed, the present invention provides an improved key shift transmission construction having a neutral collar located between a forward and a reverse gear. The neutral collar has its widest cross section centrally located thereto. From the widest central cross section, the neutral collar profile tapers down to relatively narrow cross sections at each end thereof.

Specifically, the key shift transmission of the present invention consists of a transmission or transaxle housing, a driving input shaft positioned in the housing and having an input drive pinion positioned on one end thereof, a driven input shaft having at least one groove formed therein, at least one forward and at least one reverse gear each having at least one key receiving means formed therein, each gear is operatively positioned on one end of the driven shaft, a key positioned in the groove for selectively engaging one of the key engaging means, means for shifting the key in the groove to engage the key receiving means, and a neutral collar having an internal cross section relatively wider at its center and sloped internal surfaces from the central wide cross section to each end of the collar.

Therefore, the primary object of this invention is to provide an improved key shift transmission which requires relatively little operator effort to shift the key between forward and reverse gear through the neutral collar, particularly where there is some belt drag to the transmission input; which significantly reduces key wear caused by impact between the key and the gear pocket particularly wear caused by clutchless shifting; which significantly increases the durability of the key thereby increasing product reliability; which allows for excessive clutchless shifting without undue key wear; which transposes the impact from clutchless shifting between the gear pocket and the key tip closer to the base of the key tip; which eliminates side sloping of the key from impact between the key and the gear pocket during clutchless shifting; and which effectively prevents the key from disengaging the gear pocket once shifted thereto without positive gear lever movement.

Other objects and advantages of the invention will be apparent in the following description, accompanying drawings and the appended claims.

BRIEF DESCRIPTION OF THE DRAWINGS

FIG. 3 is an partial exploded view of the transmission internal components shown in FIG. 2.

FIG. 4 is a sectional view illustrating a prior art neutral collar.

FIG. 5a is an enlarged partial sectional view illustrating the relationship between the key and the neutral collar of the prior art neutral collar of FIG. 4.

FIG. 5b is a partial view taken along line 5b—5b of FIG. 5a;

FIG. 6 is a view similar to FIG. 4 illustrating the neutral collar of the present invention.

FIG. 7a is a view similar to FIG. 5a illustrating the relationship between the key and the neutral collar of FIG. 6.

FIG. 7b will be a partial view taken along the line 7b—7b of FIG. 7a.

DESCRIPTION OF THE PREFERRED EMBODIMENT

Figure 1:
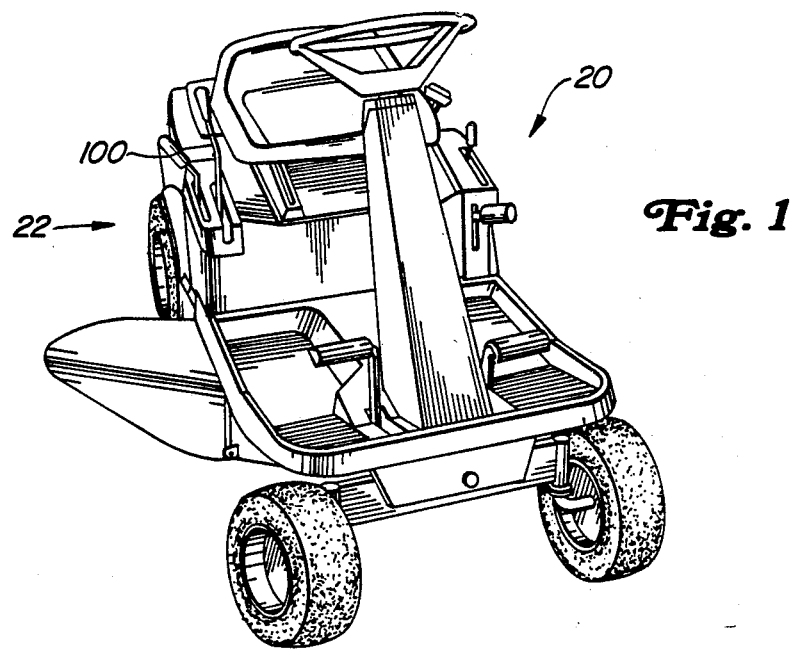
FIG. 1 is a perspective view illustrating a small lawn rider incorporating the improved key shift transmission of the present invention.

A belt driven small lawn tractor 20 is shown in FIG. 1 which incorporates the improved key shift transmission, generally designated as 22, of the present invention. Since the relative forward speed of such a vehicle is normally controlled by the belts and a variator (not shown), only one forward gear is required. While only one forward gear is illustrated, it should be apparent to those skilled in the art that the present invention could be utilized in key shift transmissions having a plurality of forward gears such as shown in U.S. Pat. No. 4,480,501 which is hereby incorporated by reference.

Figure 2:
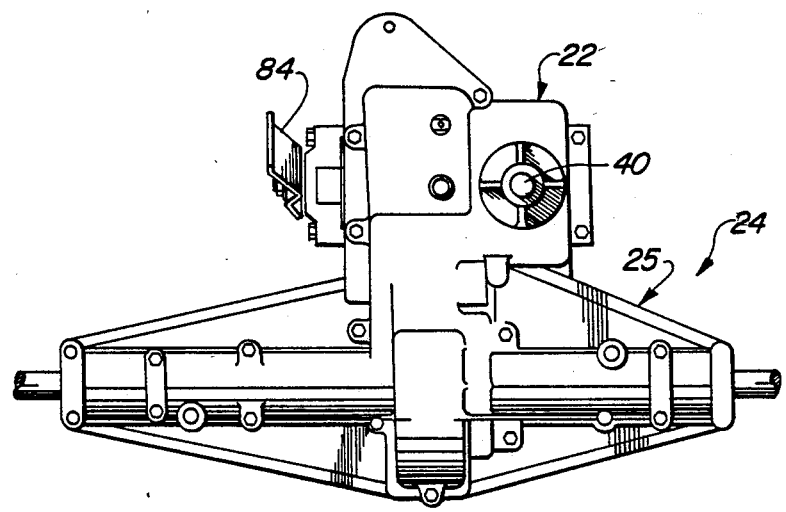
FIG. 2 is a top view of the improved transmission of the present invention.

A transaxle 24 consisting of a transmission 22 and a differential 25 is shown in FIG. 2 for utilization in the lawn tractor 20 of FIG. 1. The specific gear mechanism of the transmission 22 of FIG. 2 is illustrated in detail in FIG. 3. An input shaft 40 is operatively connected to an engine (not shown). The input shaft is positioned inside of the transmission 22 and has bearings 42 and 44 at each end thereof. One end of the input shaft 40 receives a drive pinion 46. The drive pinion 46 is conventionally operatively connected to the input shaft 40 by O-ring 48 and a thrush washer 50 positioned between the bearing 44 and the drive pinion 46. Securing the drive pinion 46 to the input shaft 40 is a retainer ring 52.

A driven shaft 60 having at least one forward 62 and one reverse gear 64 with a neutral spacer 66 operatively positioned on the shaft 60 therebetween is assembled transverse to the input shaft 40. The gears 62 and 64 are assembled on the end of the shaft 60 by flanged bushing 70. A washer 72 is positioned between the bushing and the forward gear 62. The bushing 70 is sealed on shaft 60 by a square cut seal 74.

A pair of keys 76 are positioned in a pair of slots 78 in driven shaft 60. The slots 78 are preferably formed on opposite sides of in the circular shaft 60. Each of the keys 76 has a tip 80 for engagement with one of a plurality of pockets 82 located in both the forward 62 and reverse 64 gears. There are preferably four (4) pockets formed in each gear, it being understood that more or less pockets in each gear may be adequate for the purposes of the present invention.

The relative position of the keys are conventionally controlled by a mechanism such as a rod and fork assembly 84 having a stud 86. As shown, the stud 86 engages a shift collar 88 which is operatively attached to the end of the shaft 60 opposite from the gears 62, 64. A gear spur 90 is positioned on the shaft 60 proximate the shift collar 88 and is held in position thereon by a second flanged bushing 70. A second thrush washer 72 is positioned between the bushing 70 and the gear 90 and a second square cut seal 74 is assembled over the second flange bushing 70 to secure the assembly to the shaft 60.

During operation of the riding mower 20 illustrated in FIG. 1, an operator moves gear lever 100 connected to rod and fork assembly 84 to either the forward or reverse position. By so doing, keys 76 are moved in grooves 78 such that tip 80 is moved into engagement with one of the pockets 82 in one of the gears 62, 64. When the gear lever 100 is positioned in neutral, the key tip 80 is located in the neutral collar 66 positioned between the two gears 62, 64.

As illustrated in FIGS. 6 and 7, the neutral collar 66 of the present invention has its relatively widest cross section 190 centrally located between its two ends 102, 104. The distance D between the two center points 110, 112, of the internal cross section of collar 66 is selected so that the driven shaft 60 fits snugly and rotatably therebetween. Keys 76 are selectively movable from engagement with pocket 82 in forward gear 62. As key tip 80 moves between forward gear 62 and reverse gear 64 and vice versa, it maintains contact with internal sloped surface 94 of collar 66 until it reaches cross section 90. When moving from forward gear 62 to reverse gear 64, dip 80 continues along internal sloped surface 96 until it engages pocket 82 of reverse gear 64.

It should be pointed out that it appears that by providing sloped internal surfaces 94, 96, disengagement of tip 80 from pockets 82 requires relatively less effort than with the prior collar 66' of FIGS. 4 and 5. The effort required to shift between gears appears to be related to the width Wc of the two center points 110, 112 relative the total width Wt of the internal cross section of the collar 66. If the width Wc of the two center points 110, 112 is only a point, the effort required to shift gears is relatively less. As the width Wc of the two center points 110, 112 increases, the effort required to shift gears increases to the relative maximum, as illustrated in FIG. 4. Additionally, by reducing the overlapping portion 120 between the gear pocket 82 and the collar 66, entrance and exit of the key tip 80 into and out of the pocket diverts the point of impact between the key tip 80 and the side of pocket 82 from the radially outermost portion 116 of the key tip, especially during clutchless shifting, to a location 122 near the base of the tip 80. when shifting into reverse gear and at a location 124 when shifting into forward gear depending upon the direction of rotation of the gears 62, 64.

Specifically, with the improved neutral collar 66, it appears that the impact between the key tip 80 and the gear pocket 82 takes place on either the leading or trailing edge of the key tip 80 at location 122 or 124 depending upon the direction of rotation of the gears and whether shifting into forward or reverse gear. Laboratory tests indicate that these locations of impact 122, 124 reduces damage to the radially outer most portion 116 of the key tip 80 by shifting the impact between the key tip 80 and the pockets of the surfaces 81, 83 away from the large key surfaces 81, 83 to the above mentioned edges 82 at locations 122, 124. This impact location shift apparently results in the key tip 80 not becoming disengaged from the pocket 82 due to the radially outermost portion 116 of surface 81 being beaten to a taper by repeated impact as occured with the prior collar 66'.

Laboratory test results indicate that the improved neutral collar 66 of the present invention significantly reduces the wear on both sides 81, 83 of the radially outermost corner 116 of tip 80 parallel to the shaft 60, thus eliminating the tendency of the key tip 80 from being disengaged from pocket 82 without the appropriate movement of the gear lever 84. Additionally, the same test results indicate marked improvement in durability and increased life cycle for key tip 80, pocket 82, and shaft 60, when utilizing the neutral collar 66 of the present invention as opposed to the prior collar 66'.

While the form of apparatus herein described constitutes a preferred embodiment of this invention, it is to be understood that the invention is not limited to this precise form of apparatus, and that changes may be made therein without departing from the scope of the invention which is defined in the appended claims.

I claim:

1. A key shift transmission comprising:
a housing;
a driving input shaft, operatively positioned in said housing, having an input drive pinion operatively connected to one end thereof;
a driven shaft having at least one groove formed therein;
at least one forward and one reverse gears each having at least one key receiving means, each of said gears being operatively connected to said driven shaft;
at least one key having a tip and a base forming edges for selectively engaging said key receiving means, said key being operatively positioned in said groove;
means, operatively connected to said driven shaft, for shifting said key in said groove such that said key selectively engages said key receiving means; and
a neutral collar, operatively positioned on said driven shaft between said forward and said reverse gears, for reducing wear on the radially outermost portion of said key tip, thereby extending the life cycle of said key, said collar having an internal cross section relatively thickest at its center and sloped internal surfaces from said center to each end thereof, said sloped surfaces causing said key to initially engage said key receiving means at the leading edge of said key.

2. The key shift transmission of claim 1 wherein said neutral collar reduces the effort required to move said key from engagement with one of said gears to a neutral position.

3. The key shift transmission of claim 1 wherein said key receiving means further comprises at least one pocket formed in each of said gears.

4. The key shift transmission of claim 3 wherein said key tip has a point and a base operatively positioned on said key.

5. The key shift transmission of claim 4 wherein said internal cross section of said neutral collar directs the impact of said key tip with said pocket of a selective one of said gears to a point near the base of said tip.

6. The key shift transmission of claim 3 wherein said internal internal cross section of said neutral collar provides positive key engagement with said gear pockets even after repeated shifting under load.

7. The key shift transmission of claim 4 wherein said internal cross section of said neutral collar eliminates wear on the sides of said key tip such that said key tip maintains positive engagement with said gear pocket even after repeated shifting under load.

8. A key shift transmission comprising:
a transmission housing;
a driving input shaft positioned in said housing and having an input drive pinion connected to one end thereof;
a driven shaft having at least two grooves formed therein on opposite sides thereof;
at least one reverse gear having at least two pockets formed therein and being positioned closer said first end of said driven shaft than said forward gear;
at least two keys each having a tip including a base forming edges and being positioned in said grooves, for selectively engaging and disengaging said pockets;
a rod and fork assembly for shifting said keys in said grooves, such that said key tips selectively engage and disengage said pockets; and
a neutral collar, operatively positioned between said forward and reverse gears, having an internal cross section thickest at the center thereof and sloped internal surfaces from said thickest central cross section to the ends thereof, said sloped surfaces causing the initial impact between the pockets and key tips to occur at the leading edge of said key tips.

9. The key shift transmission of claim 8 wherein said internal cross section of said neutral collar reduces the effort required to move said key from engagement with one of said gears to a neutral position.

10. The key shift transmission of claim 8 wherein said point of impact between said pockets and said edges of said key avoids damage to said radially outermost portion of said key.

11. The key shift transmission of claim 8 wherein said internal cross section of said neutral collar directs the impact of said edges with said pocket of a selective one of said gears to a location relatively nearer the base of said key.

12. The key shift transmission of claim 8 wherein said internal cross section of said neutral collar provides positive key engagement with said gear pockets even after repeated shifting under load.

13. The key shift transmission of claim 12 wherein said internal cross section of said neutral collar eliminates wear on the sides of said key such that said key tip maintains positive engagement with said gear pocket even after repeated shifting under load.

14. A key shift transmission comprising:
a transmission housing;
a driving input shaft operatively positioned in said housing, having an input drive pinion connected to one end thereof;
a driven shaft having at least two grooves formed therein on opposite sides thereof and a first and a second end thereof;
at least one forward gear having at least two pockets formed therein positioned toward said first end of said driven shaft;
at least one reverse gear having at least two pockets formed therein and being positioned closer said first end of said driven shaft than said forward gear;
at least two keys each having a tip and a base forming edges and being operatively positioned in said grooves, for selectively engaging and disengaging said pockets;
a rod and fork assembly for shifting said keys in said grooves, such that the initial impact between the key and the pocket is at the leading edge of said keys as they engage said pockets; and
a neutral collar operatively positioned between said forward and reverse gears and having an internal cross section thickest at the center thereof and sloped internal surfaces from said thickest central cross section to the ends thereof, said sloped surfaces being operative to allow said keys to engage said pockets at the edges of said keys.

15. A key shift transmission comprising:
a transmission housing;
a driving shaft operatively positioned in said housing and having an input drive pinion connected to one end thereof;
a driven shaft, operatively connected to said driving shaft, having at least two grooves formed therein on opposite sides thereof and a first and a second end thereof;
at least one forward gear having at least two pockets formed therein operatively connected to said driven shaft;
at least one reverse gear having at least two pockets formed therein and being operatively connected to said driven shaft at a position closer said first end of said driven shaft than said forward gear;
at least two keys each having a tip and a base forming edges, said keys being positioned in said grooves, said keys selectively engaging and disengaging said pockets;
a rod and fork assembly for shifting said keys in said grooves, such that said key tips selectively engage and disengage said pockets; and
a neutral collar operatively positioned between said forward and reverse gears and having an internal cross section thickest at the center thereof and sloped internal surfaces from said thickest central cross section to the ends thereof, said sloped surfaces causing said keys to initially impact said pockets on the leading edge of said keys at a point below the approximate midpoint between said tip and said base.

16. The key shift transmission of claim 15 wherein said internal cross section of said neutral collar reduces the effort required to move said key from engagement with one of said pockets to a neutral position.

17. The key shift transmission of claim 15 wherein said engagement point between said pockets and said keys avoids damage to said radially outermost portion of said keys.

18. A key shift transmission comprising:
a housing;
a driving shaft, operatively positioned in said housing and having an input pinion operatively connected to one end thereof;
a driven shaft having at least one groove formed therein, said driving shaft being operatively connected to said driven shaft;
at least one forward and one reverse gears, each having at least one key receiving means, each of said gears being operatively connected to said driven shaft;
at least one key having a tip and a base forming edges, for selectively engaging said key receiving means, said key being operatively positioned in said groove;
means, operatively connected to said driven shaft, for shifting said key in said groove such that said key selectively engages and disengages said key receiving means; and
a neutral collar, operatively positioned on said driven shaft between said forward and said reverse gears, for reducing wear on the radially outermost portion of said key tip, said collar having an internal cross section relatively thickest at its center and sloped internal surfaces from said center to each end therefor, said sloped surfaces causing said key to initially impact said key receiving means at a point on the leading edge of said key.

19. A key shift transmission comprising:
a housing;
a driving input shaft, operatively positioned in said housing, having an input drive pinion operatively connected to one end thereof;
a driven input shaft having at least one groove formed therein;
at least one forward and one reverse gears each having at least one key receiving means, each of said gears being operatively connected to said driven shaft;
at least one key having a tip operatively positioned in said groove and having means for selectively engaging said key receiving means;
means, operatively connected to said driven shaft, for selectively shifting said key in said groove to engage said key receiving means, the initial impact between said key and key receiving means occurring at the leading edge of said tip; and
a neutral collar, operatively positioned on said driven input shaft between said forward and said reverse gears, said collar having an internal cross section relatively thickest at its center and sloped internal surfaces from said center to each end thereof, said center of said collar having a thickness of at most one half the total width of said internal cross section of said collar.

20. The key shift transmission of claim 19 wherein said key tip has a point and a base operatively positioned on said key.

21. The key shift transmission of claim 20 wherein said internal cross section of said neutral collar provides for an impact location between said key receiving means and said key on an edge of said key at a location between said point and said base thereby preventing damage to said radially outermost portion of said key.

22. The key shift transmission of claim 19 wherein said key receiving means further comprises at least one pocket formed in each of said gears.

23. A key shift transmission comprising:
a transmission housing;
a driving input shaft positioned in said housing and having an input drive pinion connected to one end thereof;
a driven input shaft having at least two grooves formed therein on opposite sides thereof;
at least one forward gear having at least two pockets formed therein positioned toward a first end of said driven shaft;
at least one reverse gear having at least two pockets formed therein and being positioned closer said first end of said driven shaft than said forward gear;
at least two keys having tips and being positioned in said grooves, for selectively engaging and disengaging said pockets, said tips each having a base and a point;
a rod and fork assembly for shifting said keys in said grooves, such that upon engagement with said pockets, the initial impact upon said key is at its leading edge; and
a neutral collar, operatively positioned between said forward and reverse gears, having an internal cross section thickest at the center thereof and sloped internal surfaces from said thickest central cross section to the ends thereof, said center of said neutral collar having a thickness of at most one half the total width of said neutral collar internal cross section.

24. The key shift transmission of claim 23 wherein said internal cross section of said neutral collar reduces the effort required to move said key from engagement with one of said gears to a neutral position.

25. The key shift transmission of claim 23 wherein said internal cross section of said neutral collar provides for an impact location between said gears and said key on an edge of said key between said point and said base thereby avoiding damage to said radially outermost portion of said key.

26. The key shift transmission of claim 23 wherein said internal cross section of said neutral collar directs the impact of said key tip with said pocket of a selective one of said gears to a location adjacent the base of said key.

27. The key shift transmission of claim 26 wherein said internal cross section of said neutral collar provides positive key engagement with said gear pockets even after repeated shifting under load.

28. The key shift transmission of claim 27 wherein said internal cross section of said neutral collar eliminates wear on the sides of said key such that said key tip maintains positive engagement with said gear pocket even after repeated shifting under load.

29. A key shift transmission comprising:
a transmission housing;
a driving input shaft position in said housing and having an input drive pinion connected to one end thereof;
a driven input shaft having at least two grooves formed therein on opposite sides thereof;
at least one forward gear having at least two pockets formed therein positioned toward a first and said driven shaft;
at least one reverse gear having at least two pockets formed therein and being positioned closer said first end of said driven shaft than said forward gear;
at least two keys having tips and being positioned in said grooves, for selectively engaging and disengaging said pockets, said tips each having a base and a point;
a rod and fork assembly for shifting said keys in said grooves, such that said key tips selectively engage and disengage at pockets; and
a neutral collar operatively positioned between said forward and reverse gears and having an internal cross section thickest at the center thereof and sloped internal surfaces from said thickest central cross section to the ends thereof, said sloped surfaces being operative to allow said keys to initially engage said pockets on the leading edge of said keys below said point and above said base.

* * * * *